US005878574A

United States Patent [19]

Linkner, Jr. et al.

[11] Patent Number: 5,878,574

[45] Date of Patent: Mar. 9, 1999

[54] MASTER CYLINDER HAVING NESTED CONCENTRIC PISTONS

[75] Inventors: Herbert L. Linkner, Jr., Dexter; Wendell D. Tackett, Ann Arbor, both of Mich.

[73] Assignee: Kelsey-Hayes Company, Livonia, Mich.

[21] Appl. No.: 811,658

[22] Filed: Mar. 5, 1997

Related U.S. Application Data

[60] Provisional application No. 60/012,851 Mar. 5, 1996.

[51] Int. Cl.[6] ................................ B60T 11/20; F15B 7/00

[52] U.S. Cl. ................................ 60/562; 60/594; 60/581

[58] Field of Search ............................ 60/562, 594, 581, 60/582, 577, 574, 576; 303/114.1; 188/347; 267/161, 163, 158

[56] References Cited

U.S. PATENT DOCUMENTS

| | | | |
|---|---|---|---|
| 2,158,418 | 5/1939 | Gits | 267/161 X |
| 2,356,310 | 8/1944 | Gass | 267/161 |
| 3,142,965 | 8/1964 | Hazelbaker | 60/581 |
| 3,203,187 | 8/1965 | Randol . | |
| 3,483,888 | 12/1969 | Wurzel | 267/161 X |
| 3,701,257 | 10/1972 | Gaiser . | |
| 3,800,540 | 4/1974 | Papiau | 60/581 |
| 4,026,109 | 5/1977 | Fay | 60/581 |
| 4,072,012 | 2/1978 | Kawakami | 60/562 |
| 4,161,105 | 7/1979 | Hagiwara . | |
| 4,241,583 | 12/1980 | Farr | 60/555 |
| 4,253,306 | 3/1981 | Kuroki | 60/562 X |
| 4,329,846 | 5/1982 | Gaiser . | |
| 4,475,338 | 10/1984 | Gaiser . | |
| 4,492,293 | 1/1985 | Maucher | 267/158 X |
| 4,496,033 | 1/1985 | Hall et al. | 188/347 |
| 4,503,677 | 3/1985 | Crumb et al. . | |
| 4,514,982 | 5/1985 | Bach et al. . | |
| 4,621,498 | 11/1986 | Schaefer . | |
| 4,649,707 | 3/1987 | Belart . | |
| 4,852,351 | 8/1989 | Price | 60/562 X |
| 4,887,916 | 12/1989 | Adam et al. | 267/161 X |
| 5,246,281 | 9/1993 | Leppek | 303/114.1 |

*Primary Examiner*—John E. Ryznic

*Attorney, Agent, or Firm*—MacMillan, Sobanski & Todd, LLC

[57] ABSTRACT

An improved force transfer arrangement for use in a dual circuit master cylinder having a pair of nested concentric pistons for pressurizing a pair of respective fluid chambers, wherein the force transfer arrangement imparts an input force from an input piston on a pair of pistons such that the pair of pistons can move relative to each other to compensate for different travel lengths. The invention discloses three embodiments of the improved force transfer arrangement. A first embodiment includes a hydraulic fluid chamber in fluid communication with the input piston and the pair of pistons. A second embodiment includes a circumferentially arranged ball mechanism positioned between the input piston and the pair of pistons. A third embodiment includes a notched lever ring assembly positioned between the input piston and the pair of pistons.

32 Claims, 4 Drawing Sheets

MASTER CYLINDER HAVING NESTED CONCENTRIC PISTONS

CROSS REFERENCE TO RELATED APPLICATIONS

This application claims the benefit of U.S. Provisional Application No. 60/012,851 filed Mar. 5, 1996.

BACKGROUND OF THE INVENTION

This invention relates in general to vehicle hydraulic brake systems, and in particular to dual circuit master cylinders incorporated in such vehicle hydraulic brake systems.

Conventional vehicle hydraulic brake systems commonly have two hydraulic circuits: a primary circuit and a secondary circuit. For a vehicle having four wheel brakes in which there is a pair of front wheel brakes and a pair of rear wheel brakes, the primary and secondary circuits can be connected to the wheel brakes by various configurations, such as a diagonally split arrangement or a vertically split arrangement. In a diagonally split arrangement, the primary circuit is connected to one of the front wheel brakes and also to one of the rear wheel brakes on the opposite side from the connected front wheel brake. The secondary circuit is then connected to the other front wheel brakes and the other rear wheel brake on the opposite side of the connected front wheel brake. In a vertically split arrangement, the primary circuit is connected to, for example, the front wheel brakes, and the secondary circuit is connected to the rear wheel brakes. The use of two brake circuits helps to maintain a source for braking of the vehicle in case of failure of one of the brake circuits.

A dual circuit or tandem master cylinder is often used to supply pressurized fluid to each of the primary and secondary brake circuits. A tandem master cylinder generally includes a pair of pistons which are operatively connected to a brake pedal which is operated by the driver of the vehicle. Actuation of the brake pedal causes movement of the pistons which energize separate fluid chambers in fluid communication with the primary and secondary brake circuits, respectively.

Such tandem master cylinders, however, can have significant drawbacks if one of the brake circuits should fail. For example, upon failure of one of the brake circuits, the piston stroke of the master cylinder can rapidly increase, thereby causing the brake pedal to "drop" or travel an undesirable relatively large distance. This pedal drop can cause great alarm to the operator of the vehicle and possibly produce a panic situation for the operator. Thus, a relatively large pedal drop during a single circuit failure is an undesirable quality.

For this reason, it would be desirable to have a tandem master cylinder in which pedal drop reduced in the event that one of the brake circuits should fail.

BRIEF SUMMARY OF THE INVENTION

This invention relates in general to a force transfer arrangement for use in a dual circuit master cylinder having a pair of nested concentric pistons, wherein the force transfer arrangement imparts an input force on the pair of pistons such that the pair of pistons can move relative to each other to compensate for different travel lengths. In one embodiment of the invention, a dual circuit master cylinder for a vehicle brake system is used, in which the master cylinder has a housing having a bore formed therein, wherein the bore defines an axis. A primary piston, which has a central bore formed therethrough, is slidably disposed within the bore of the housing. The primary piston has a first end and a second end which defines a boundary wall of a primary fluid chamber defined within the bore of the housing. The primary fluid chamber is adapted to be connected in fluid communication with a primary brake circuit. The master cylinder further includes a secondary piston slidably disposed within the central bore of the primary piston and extending from one end thereof. The secondary piston has a first end and a second end which defines a boundary wall of a secondary fluid chamber defined within the bore of the housing. The secondary fluid chamber is adapted to be connected in fluid communication with a secondary fluid circuit. The master cylinder further includes an input piston which is slidably disposed within the bore of the housing.

In accordance with the invention, the input piston is coupled to the primary and secondary pistons by a force transfer arrangement such that a force input acting on the input piston is transmitted to the primary and secondary pistons, thereby urging the primary and secondary pistons to move in an apply direction parallel to the axis. The movement of the primary and secondary pistons pressurizes the primary and secondary fluid chambers, respectively. The coupling permits the primary and secondary pistons to move relative to each other to compensate for travel length variations between the primary and secondary pistons while maintaining approximately equal pressures generated in the primary and secondary fluid chambers. The difference in travel lengths can be caused by various factors, such as manufacturing tolerances, uneven pad wear, or brake piston seal rollback in the various brake components.

In one specific embodiment of the invention, the input piston, the primary piston, and the secondary piston are coupled by an input fluid chamber defined therebetween. The input fluid chamber typically contains a trapped volume of fluid. Movement of the input piston in the apply direction pressurizes the fluid within the input fluid chamber which applies pressure to the first ends of the primary and secondary pistons, thus urging the primary piston and the secondary piston to move in the apply direction. The movement of the primary and secondary pistons pressurizes the primary and secondary fluid chambers, respectively. The hydraulic fluid coupling allows the primary piston to move relative to the secondary piston while a relatively constant force is maintained against both primary and secondary pistons. If desired, a source of pressure can selectively be in fluid communication with the input fluid chamber so that various electrical brake control devices can actuate the master cylinder to engage brake control schemes, such as, traction control and vehicle stability control, wherein the operator is not manually actuating the master cylinder by depression of the brake pedal. A single valve or a plurality of valves can be used to regulate the pressure between the source of pressure and the input fluid chamber.

The input piston, the primary piston, and the secondary piston can also be coupled by a mechanical force transfer structure which applies a generally equal force to the primary and secondary pistons while permitting relative limited motion therebetween. In one specific embodiment of the invention, a plurality of balls are used to transfer an axial force from an engaged surface of the input piston to sloped surfaces formed on the first ends of the primary and secondary pistons. If one of the primary or secondary pistons were to move relative to the other, the plurality of balls move along the sloped surfaces to compensate for the different travel lengths. Preferably, the surface of the input piston has a relatively low coefficient of friction to assist the movement of the plurality of balls across the surface when one of the primary or secondary pistons move relative to the other.

In another embodiment of the invention, the mechanical force transfer structure includes a notched lever ring assembly positioned between the input piston and the first and second ends of the primary and secondary pistons. The notched lever ring assembly has a plurality of V-shaped members having first and second arms joined at a vertex portion. The lever members are attached by a plurality of segment members such that the lever members are positioned in a circular arrangement. The vertex portion engages an end wall of the input piston. The first arm engages the first end of the primary piston, and the second arm engages the first end of the secondary piston. When the master cylinder is actuated, movement of the input piston imparts an input force on the vertex portions of the lever members. The input force is transmitted first and second arms of the lever members to the primary and secondary pistons, thereby causing the primary and secondary pistons to move in the apply direction to pressurize the primary and secondary fluid chambers. The lever members are pivotable about the adjoining area of the segments, thereby allowing the primary piston to move relative to the secondary piston while maintaining generally equal forces acting on the primary and secondary pistons.

Various objects and advantages of this invention will become apparent to those skilled in the art from the following detailed description of the preferred embodiment, when read in light of the accompanying drawings.

DETAILED DESCRIPTION OF THE INVENTION

Figure 1:
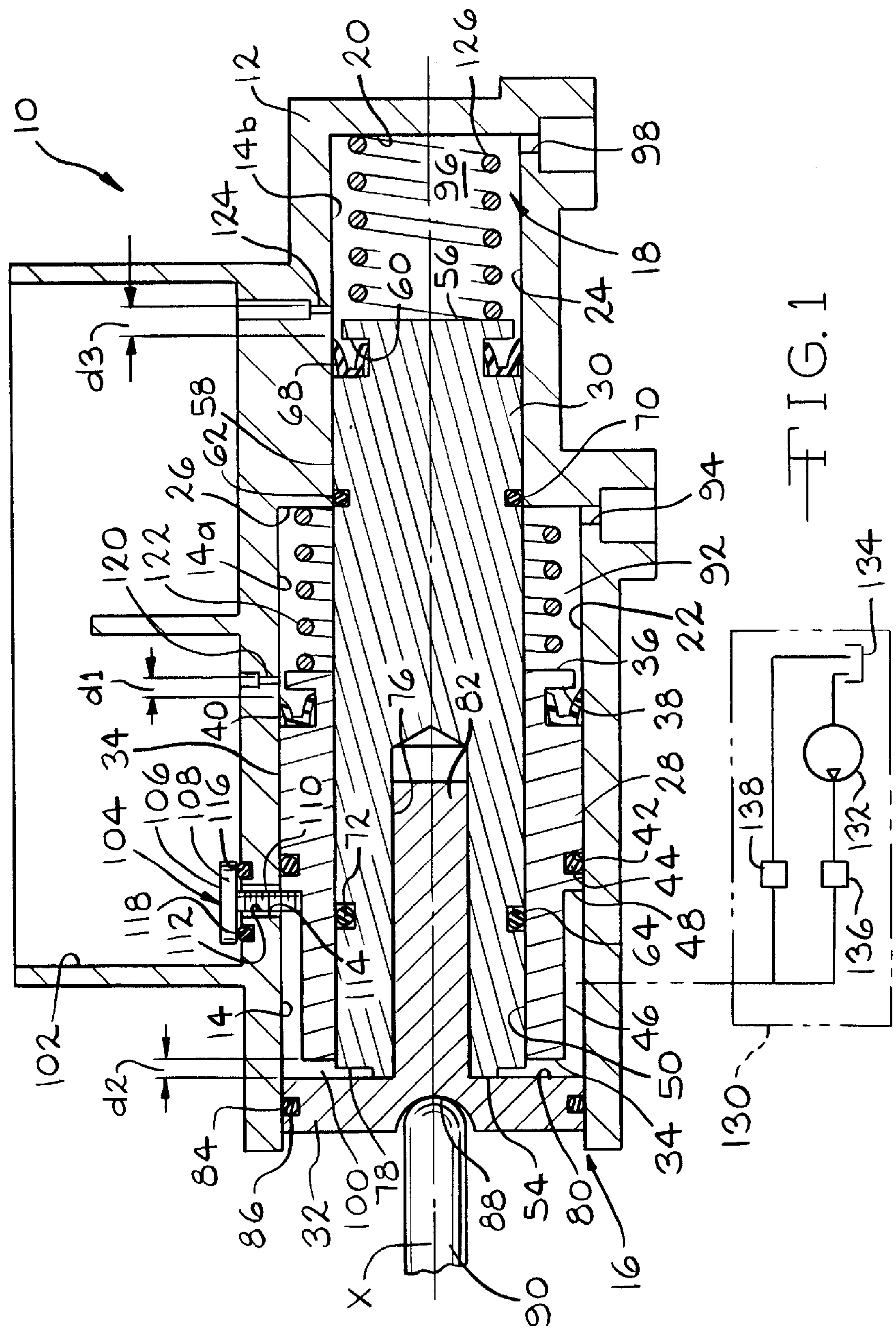
FIG. 1 is a cross-sectional view of a first embodiment of a master cylinder, in accordance with the present invention.

Referring now to the drawings, there is illustrated in FIG. 1 a first embodiment of a tandem master cylinder, generally indicated at 10, in accordance with the invention. The master cylinder 10 is adapted to be installed in a vehicle brake system (not shown). The master cylinder 10 includes a housing 12 having a cylindrical multi-stepped bore 14 formed therein and defining as axis "X". The bore 14 has an open end 16 and a closed end 18 forming an end wall 20. The bore 14 has a large diameter portion **14*a* defining a first cylindrical wall 22, and a small diameter portion 14*b* defining a second cylindrical wall 24. A shoulder 26 is formed between the first and second cylindrical walls 22 and 24. Preferably, the large diameter portion 14*a* is concentric with the small diameter portion 14*b*. The bore 14 can be easily manufactured by using, for example, a single rotating cutting tool having a pair of cutting bits corresponding to the dimensions of the large and small diameter portions 14*a* and 14*b***.

The master cylinder 10 includes three movable cylindrical pistons axially disposed within said bore 14: a primary piston 28, a secondary piston 30, and an input piston 32. The primary piston 24 is tubular shaped and is slidably disposed within the large diameter portion **14*a* of the bore 14. The primary piston 28 has a first end 34 on the left-hand end of the primary piston 28 as viewed in FIG. 1, and a second end 36 on the right-hand end of the primary piston 28 when viewing FIG. 1. The primary piston 28 has a cylindrical outer surface 34, having a circumferential groove 38 formed therein and located adjacent the second end 36 of the primary piston 28. A primary seal 40 is seated within the groove 38 and sealingly engages the first cylindrical wall 22 of the large diameter portion 14*a* of the bore 14. The primary piston includes another circumferential groove 42 formed in the outer surface 34 of the primary piston 28 and houses a seal 44 sealingly engaged with the first cylindrical wall 22 of the bore 14. An annular recess 46 is formed in the outer surface 34 of the primary piston 28 and is located at the first end 34 of the primary piston 28, the reason for which will be explained below. A shoulder 48 is formed between the annular recess 46 and the outer surface 34 of the primary piston 28. The primary piston 28 further includes a cylindrical central bore 50** formed therethrough.

The secondary piston 30 is cylindrical shaped and is slidably disposed within the central bore 50 of the primary piston 28, resulting in a nested concentric parallel arrangement of the primary and secondary pistons 28 and 30. The secondary piston 30 has a first end 54 on the left-hand end of the secondary piston 30 as viewing FIG. 1, and a second end 56 on the right-hand end of the secondary piston 30 when viewing FIG. 1. The secondary piston 30 has a cylindrical outer surface 58 having three circumferential grooves 60, 62, and 64 formed therein. A secondary seal 68 is seated within the groove 60 positioned adjacent the second end 56 of the secondary piston 30 and sealingly engages the second cylindrical wall 24 of the small diameter portion **14*b* of the bore 14. A seal 70 is seated within the groove 62 and sealingly engages the second cylindrical wall 24 of the small diameter portion 14*b* of the bore 14. A seal 72 is seated within the groove 64 and sealingly engages the wall of the central bore 50 of the primary piston 28. The secondary piston 30 further includes an axial bore 76 formed through the first end 54 therein. Preferably, the first end 54 of the secondary piston 30 has an annular recess 78** formed therein, for reasons which will be explained below.

The input piston 32 is slidably disposed within the large diameter portion 14*a* of the bore 14. The input piston 32 has an end wall 80 facing the first ends 34 and 54 of the primary and secondary pistons 28 and 30, respectively. The input piston 32 further includes a stem 82 extending axially outwardly from the end wall 80. The stem 82 is slidably disposed within the axial bore 76 of the secondary piston 30. The input piston 32 has a circumferential groove 84 in which a seal 86 is seated. The seal 86 sealingly engages the first cylindrical wall 22 of the large diameter portion 14*a* of the bore 14. The input piston 32 also includes an axially located recess 88 which accepts an input rod 90 operatively engaged with the input piston 32. The input rod 90 is operatively attached to a brake pedal (not shown) of a vehicle (not shown) in which the master cylinder 10 is installed.

The large diameter portion 14*a* of the bore 14, the second end 36 of the primary piston 28, and the outer surface 58 of the secondary piston 30 cooperate to generally define a variable volume primary fluid chamber 92 for containment of hydraulic brake fluid. The second end 36 of the primary piston 28 defines a movable boundary wall, in which movement of the primary piston 28 enables the volume of the primary fluid chamber 92 to increase of decrease. The primary fluid chamber 92 is in fluid communication with a primary brake circuit (not shown) of the vehicle in which the master cylinder 10 is installed via a primary outlet port 94 formed in the housing 12. The small diameter portion 14*b* of the bore 14 and the second end 56 of the secondary piston 30 cooperate to generally define a variable volume secondary fluid chamber 96 for containment of hydraulic brake fluid. The second end 56 of the secondary piston 30 defines a movable boundary wall, in which movement of the secondary piston 30 enables the volume of the secondary fluid chamber 96 to increase or decrease. The secondary fluid chamber 96 is in fluid communication with a secondary brake circuit (not shown) of the vehicle in which the master cylinder 10 is installed via a secondary outlet port 98 formed in the housing 12. The primary and secondary circuit can be, for example, hydraulically connected to front and rear brake cylinders (not shown).

An input fluid chamber 100 is generally defined by the large diameter portion 14*a* of the bore 14, the end wall 80 and stem 82 of the input piston 32, the axial bore 76 and first end 54 of the secondary piston, and the first end 34 and annular recess 46 of the primary piston 28. As will be explained in detail below, during normal brake apply of the master cylinder 10, the volume of the fluid within the input fluid chamber 100 remains substantially constant.

The master cylinder 10 further includes a hydraulic fluid reservoir 102 for retaining a volume of hydraulic brake fluid. The reservoir 102 can be integral with the housing 12, as shown in FIG. 1, or can be a separate component which is connected to the master cylinder 10. Preferably, the master cylinder 10 includes a valve, indicated generally at 104, for selectively allowing fluid communication between the reservoir 102 and the input fluid chamber 100, particularly during initial bleeding of the master cylinder 10. The valve 104 can be any suitable arrangement which selectively allows fluid communication between the reservoir 102 and the input fluid chamber 100. In the embodiment illustrated in FIG. 1, the valve 104 includes a plug 106 having a head 108 and a threaded portion 110 threadably engaged with a threaded bore 112 formed in the housing 12. The threaded bore 112 has a plurality of slots 114 formed through the threads which communicate with the reservoir 102 and the input fluid chamber 100. A seal, such as an O-ring 116, is seated within a recess 118 formed in the housing and sealingly engages the head 108 with a portion of the housing 12, thereby preventing the flow of fluid through the slots 114. When fluid communication is desired, such as during bleeding of the master cylinder 10, the plug 106 is moved outwardly from the housing 12 until the O-ring 116 is no longer in contact with the head 108, thereby exposing the slots 114. Of course, other valves can be used, such as a check valve arrangement (not shown) which restricts the flow of fluid in a direction from the input fluid chamber 100 to the reservoir 102, yet allow the flow of fluid in a direction from the reservoir 102 to the input fluid chamber 100, thereby compensating for any minor fluid losses within the input fluid chamber 100.

The reservoir 102 is in fluid communication with the primary fluid chamber 92 via a primary compensation port 120 formed in the housing 12 when the primary piston 28 is at a non-actuated or rest position, as shown in FIG. 1. The primary compensation port 120 is positioned at a predetermined distance "d1" from the primary seal 40 when the primary piston 28 is in the rest position. The primary piston 28 is biased into the rest position by a primary return spring 122 acting against the second end 36 of the primary piston 28, thereby urging the primary piston 28 leftward, as viewing FIG. 1, so that the shoulder 48 of the primary piston abuts against the threaded portion 110 of the plug 106. Thus, the threaded portion 110 also acts as a piston stop for positioning the primary piston 28 in its rest position. At its rest position, the primary piston 28 is positioned at a distance "d2" from the end wall 80 of the input piston 32.

The reservoir 102 is also in fluid communication with the secondary fluid chamber 96 via a secondary compensation port 124 formed in the housing 12 when the secondary piston 30 is at a rest position, as shown in FIG. 1. The secondary compensation port 124 is positioned at a predetermined distance "d3" from the secondary seal 68 when the secondary piston 30 is in the rest position. The secondary piston 30 is biased into the rest position by a secondary return spring 126 acting against the second end 56 of the secondary piston 30, thereby urging the secondary piston leftward, as viewed in FIG. 1, so that the first end 54 abuts the end wall 80 of the input piston 32. The input piston 32 is situated at a rest position, as shown in FIG. 1, by the engagement of the input rod 90.

Operation of the master cylinder 10 will now be described. for the purpose of illustration, the primary piston 28, the secondary piston 30, and the input piston 32 are taken to be in their rest positions, as shown in FIG. 1. When braking is desired, the driver of the vehicle depresses a brake pedal (not shown) which causes the input rod 90 to move in an apply direction, rightward when viewing FIG. 1. The input rod 90 urges the input piston 32 to also move in the apply direction, which in turn causes the secondary piston 30 to move because of the engagement of the first end 54 of the secondary piston 30 with the end wall 80 of the input piston. Due to the trapped fluid within the input fluid chamber 100, the primary piston 28 is also urged in the apply direction. Thus, initially, the primary piston 28 and the secondary piston 30 are moving in unison.

As long as the primary and secondary circuits are intact, it will be appreciated that movement of the input piston 32, the primary piston 28, and the secondary piston 32 is governed by the general equation:

$$A_i x_i = A_p x_p + A_s x_s,$$

where $A_i$=area of the input piston 32;

$x_i$=travel length of the input piston 32;

$A_p$=area of the primary piston 28;

$x_p$=travel length of the primary piston 28;

$A_s$=area of the secondary piston 30; and $x_s$=travel length of the secondary piston 30

The pressure within the primary and secondary fluid chambers 92 and 96 is relatively low because of the fluid communication with reservoir 102 via the primary and secondary compensation ports 120 and 124, respectively. When the primary piston 28 has moved the distance "d1", the primary seal 40 has been moved past the primary compensation port 120, thereby preventing fluid communication between the primary fluid chamber 92 and the reservoir 102. Further movement of the primary piston 28 will cause an increase in the pressure of the fluid within the primary fluid chamber 92 and, therefore, an increase in the pressure of the input fluid chamber 100. Thus, further movement of the input piston 32 causes the secondary piston 30 to advance from the end wall 80 of the input piston 32 due to the trapped fluid within the input fluid chamber 100 acting on the first end 54 of the secondary piston 30. Note that the annular recess 78 at the first end 54 of the primary piston 28 helps to provide fluid access to the first end 54. Typically, movement of the primary piston 28 in the apply direction when the primary seal 40 is just past the primary piston 28 will cause the pressure within the primary fluid chamber 92 to be many times greater than the pressure within the secondary fluid chamber. Therefore, the primary piston 28 will approximately remain in the same position as the input piston 32 is moved further in the apply direction, and the trapped volume of fluid within the input fluid chamber will generally only cause the secondary piston 30 to move in the apply direction.

When the secondary piston 30 has moved the distance "d2", the secondary seal 68 has moved past the secondary compensation port 124, thereby preventing fluid communication between the secondary fluid chamber 96 and the reservoir 102. The first ends 34 and 54 of the primary and secondary pistons 28 and 30, respectively, are then both spaced from the end wall 80 of the input piston 32 by a controlled clearance length, in which the primary piston 28 and the secondary piston 30 are said to be in an apply position. Further movement of the input piston 32 causes the primary piston 28 and the secondary piston 30 to move in unison, thereby pressurizing the fluid within the primary fluid chamber 92 and the secondary fluid chamber 96, respectively. The fluid pressure of the trapped volume of fluid within the input fluid chamber 100 hydraulically couples the input piston 32 to the primary piston 28 and the secondary piston 30 so that equal forces are applied to the first ends 34 and 54 of the primary and secondary pistons 28 and 30, respectively. Thus, the primary piston 28 can move relative to the secondary piston 30 to compensate for travel length variations between the primary and secondary pistons 28 and 30, while the hydraulic coupling of the input fluid chamber 100 helps to assure that the pressures generated in the primary fluid chamber 92 and the secondary fluid chamber 96 are approximately equal. In other words, the controlled clearance allows the master cylinder 10 to supply equal pressures to the primary and secondary brake circuits despite the fact that the primary piston 28 of the secondary piston 30 may move slightly different travel lengths. The travel length of the primary and secondary pistons 28 and 30 may differ slightly due to various factors, such as manufacturing tolerances, uneven pad wear, or brake piston seal rollback in the various brake components (not shown).

When the braking force from the input rod 90 by the brake pedal is released, the pressure within the primary fluid chamber 92 and the force from the primary return spring 122 urge the primary piston back to its rest position, as shown in FIG. 1. Likewise, the pressure within the secondary fluid chamber 96 and the force from the secondary return spring 126 urge the secondary piston 30 back to its rest position.

In the event that either the primary or secondary brake circuits fail, the master cylinder 10 of the present invention are preferably designed such that the pressure of the non-failed circuit will automatically increase by the amount of the decrease in pressure of the failed circuit. For example, if the primary and secondary pistons are positioned in their respective apply positions, as discussed above, and the pressure within the primary circuit decreases due to a failed circuit, such as by a fluid leak, the first end 54 of the secondary piston 30 will be urged against the end wall 80 of the input piston 30 due to the higher pressure within the secondary fluid chamber 96 compared to the pressure within the primary fluid chamber 92. Because of the relatively small distance the primary and secondary piston 28 and 30 were originally spaced apart from the end wall 80 of the input piston 32, the secondary piston 30 will not drop significantly, thereby minimizing the pedal drop felt by the driver of the vehicle. The pressure within the input fluid chamber 100 will remain approximately at the same pressure as prior to the failing of the primary circuit. The pressure in the input fluid chamber 100 will then automatically act against the first end 54 of the secondary piston 30 at an increased level, and the pressure within the secondary fluid chamber 96 will proportionally increase by approximately the amount of the decrease in pressure within the failed primary fluid chamber 92. Therefore, the combined braking force applied to the primary and secondary brake circuits will not be reduced significantly. Similarly, if the secondary circuit should fail, the first end 34 of the primary piston 28 will be urged against the end wall 80 of the input piston and the pressure within the primary chamber 92 will increase proportionally to the loss of pressure within the secondary fluid chamber 96.

If desired, the input fluid chamber 100 can be in fluid communication with a hydraulic control circuit, indicated schematically at 130, for controlling the pressure or volume of fluid within the input fluid chamber 100. The hydraulic control unit circuit 130 can be used for various functions, such traction control or vehicle stability control, in which braking is desired but the operator of the vehicle has not manually depressed the brake pedal. The hydraulic control circuit 130 can include, for example, a source of pressure, such as a pump 132 which is supplied by a reservoir 134. The reservoir 134 can be a separate reservoir or a portion of the reservoir 102. Preferably, the hydraulic control circuit includes a pair of valves, such as an apply valve 136 and a dump valve 138 for regulating the fluid pressure within the input fluid chamber 100.

Fluid can be added or removed from the input fluid chamber 100 for other reasons, such as for pedal travel amplification or for adjustment of the brake pedal position. The fluid within the input fluid chamber 100 can also be monitored such as by a pressure sensor for use in signaling a brake light or for signaling an anti-lock brake operation.

It should be understood that any of the seals 40, 42, 68, 70, 72, and 84 can be any suitable seal structure, such as a lip seal or an O-ring seal, and not limited to the illustrated structure as shown in FIG. 1.

Figure 2:
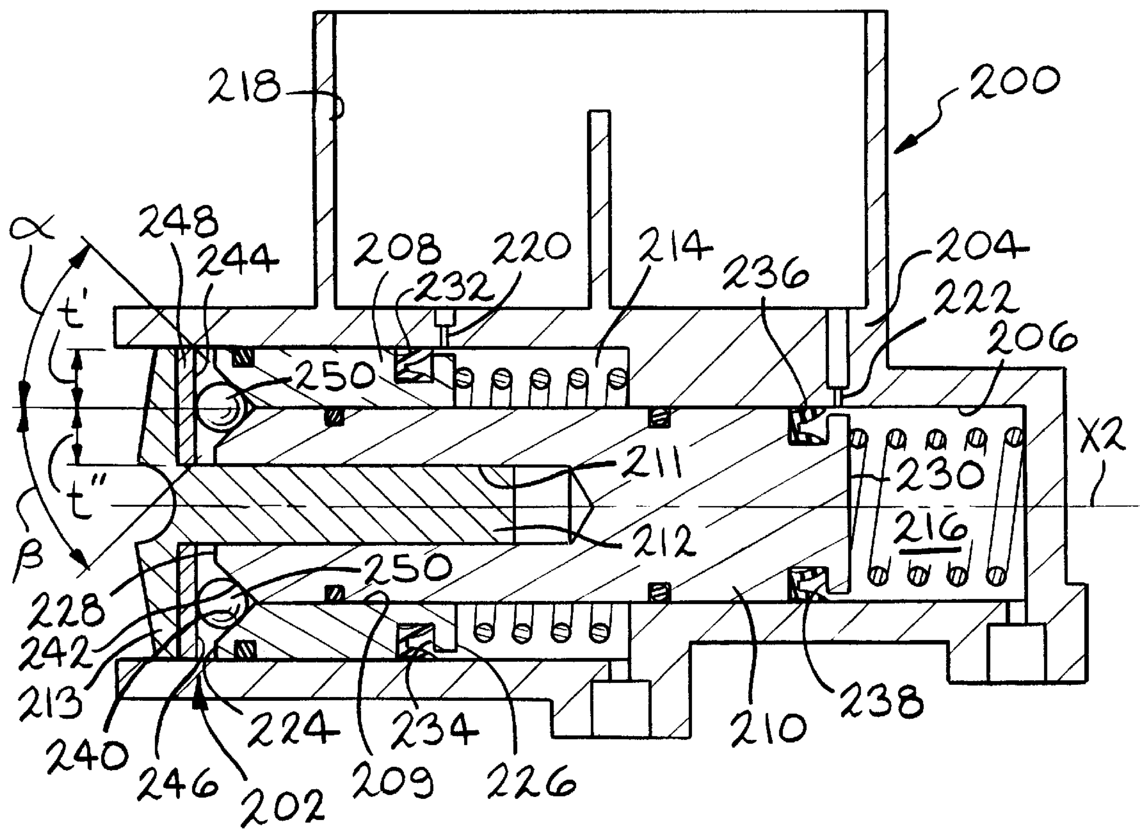
FIG. 2 is a cross-sectional view of a second embodiment of a master cylinder, in accordance with the invention.

FIG. 2 is an illustration of a second embodiment of a master cylinder, indicated at 300, in accordance with the present invention. The master cylinder 200 is generally similar in function and structure to the master cylinder 10 of FIG. 1, but replaces the input fluid chamber 100 with a mechanical force transfer structure, generally indicated at 202. Features of the master cylinder 200 which are not discussed can be assumed to be similar in function to like features in the master cylinder 10 of FIG. 1.

The master cylinder 200 includes a housing 204 and a multi-stepped bore 206 formed therein defining an axis "X2". A tubular shaped primary piston 208 having a central bore 209 formed therethrough is slidably disposed within the bore 206. A cylindrically shaped secondary piston 210 is slidably disposed within the central bore 209 of the primary piston 208. The secondary piston 210 has an axial bore 211 in which an axially extending stem 212 of an input piston 213 is slidably disposed. The master cylinder 200 further includes a primary fluid chamber 214 and a secondary fluid chamber 216. A reservoir 218 is in fluid communication with the primary fluid chamber 214 via a primary compensation port 220 formed through the housing 206. The reservoir 218 is also in fluid communication with the secondary fluid chamber 216 via a secondary compensation port 222 formed trough the housing 206. The primary piston 206 includes a first end 224 and a second end 226 which defines a movable boundary wall for the primary fluid chamber 214. The secondary piston 208 includes a first end 228 and a second end 230 which defines a movable boundary wall for the secondary fluid chamber 216. A primary seal 232 is seated within a groove 234 formed in the primary piston 208 and is sealingly engaged with the wall of the bore 206. A secondary seal 236 is seated within a groove 238 formed in the secondary piston 210 and is sealingly engaged with the wall of the bore 206. Preferably, the distance from the primary seal 232 and the primary compensation port 220 is approximately equal to the distance from the secondary seal 236 to the secondary compensation port 222.

The first end 224 of the primary piston 208 has an annular shaped primary sloped surface 240 formed therein. The primary sloped surface is at an angle $\alpha$ with respect to the axis "X2". The first end 228 of the secondary piston 210 has an annular shaped secondary sloped surface 242 formed therein. The secondary sloped surface 242 is at an angle $\beta$ with respect to the axis "X2". The input piston 213 has an end wall 244 which is preferably perpendicular to the axis "X2". The end wall 244 can be an integral part of the input piston 213 or, preferably, a surface 246 of an annular washer 248. Preferably, the surface 246 of the washer 248 is made of a hard material having a relatively low coefficient of friction, most preferably within the range of from about 0.04 to about 0.35.

The mechanical force transfer structure 202 includes a plurality of balls 250 disposed between and in contact with the surface 246 of the washer 248 and the primary and secondary sloped surfaces 240 and 242 of the primary and secondary pistons 208 and 210, respectively. The mechanical force transfer structure 202 is generally defined by the balls 250, the surface 246 of the washer 248, the primary sloped surface 240 of the primary piston 208, and the secondary sloped surface 242 of the secondary piston 210.

In operation of the master cylinder 200, the input piston 213 is moved in an apply direction, rightward as viewing FIG. 2, by a pedal input rod (not shown). The surface 246 of the washer 248 imparts a force on the plurality of balls in the apply direction. The plurality of balls imparts an axial force on the primary and secondary sloped surfaces 240 and 242, thereby causing the primary and secondary pistons 208 and 210, respectively, to move in the apply direction. The movement of the primary and secondary pistons 208 and 210 pressurize the primary and secondary fluid chambers 214 and 216, respectively, similar to the master cylinder 10 of FIG. 1. If the angles $\alpha$ and $\beta$ are equal, the axial forces imparted on the primary and secondary pistons 208 and 210 will be approximately equal. Preferably, the angles $\alpha$ and $\beta$ are within the range of from about 40 degrees to about 50 degrees, and more preferably are about 45 degrees. A relatively large angle $\alpha$ or $\beta$ might not allow a large enough difference in the travel lengths of the primary and secondary pistons 28 and 30. If the angle of $\alpha$ or $\beta$ is relatively small, the plurality of balls 250 can cause an undesirable high radial force acting on the primary and secondary pistons 28 and 30, thereby causing a "wedging" action.

The mechanical force transfer structure 202 allows the primary piston 208 to move axially with respect to the secondary piston 210, while maintaining generally equal forces acting on the primary and secondary pistons 208 and 210. For example, if the axial travel length of the primary piston 208 was slightly longer than the axial travel length of the secondary piston 210, the plurality of balls would slide radially outwardly along the surface 246 of the washer 248, and roll along the sloped surfaces 240 and 242 to compensate for the different positions of the primary and secondary pistons 208 and 210.

Preferably, the diameter of each of the plurality of balls 250 is slightly smaller than the radially extending wall thickness t' of the first end 224 of the tubular shaped primary piston 208. Likewise, the diameter of each of the plurality of balls is preferably slightly smaller than the radially extending wall thickness t" of the tubular shaped first end 228 of the secondary piston 210. In the event of a failed primary or secondary brake circuit, the plurality of balls 250 will be radially positioned so that the first end 224 or 228 of the primary piston 208 or the secondary piston 210, respectively, of the non-failed brake circuit engages the surface 246 of the washer 248. Thus, the apply force of the input piston 213 will automatically be proportionally transmitted to the respective primary piston 208 or the secondary piston 210 of the non-failed brake circuit.

Figure 3:
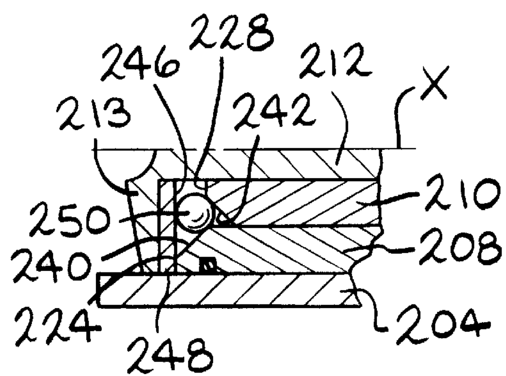
FIG. 3 is a sectional view of a portion of the master cylinder of FIG. 2, illustrating the positions of the pistons in the event of a secondary brake circuit failure.
Figure 4:
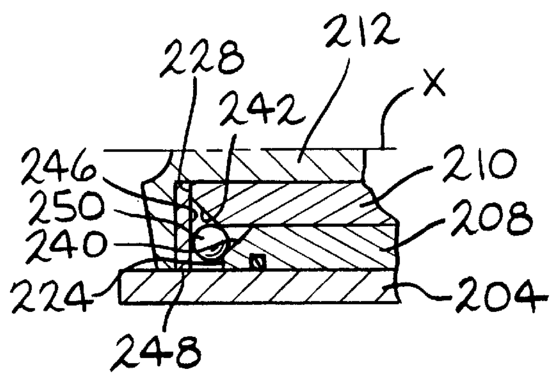
FIG. 4 is a sectional view of a portion of the master cylinder of FIG. 2, illustrating the positions of the pistons in the event of a primary brake circuit failure.

For example, if the secondary brake circuit failed, such as by a fluid leak, the pressure within the secondary fluid chamber 216 will decrease. The reduction in pressure within the secondary fluid chamber 216 will cause the plurality of balls 250 to move radially inwardly since the pressure acting on the second end 226 of the primary piston 208 is greater than the pressure acting against the second end 230 of the secondary piston 210. A continuing decrease in the pressure within the secondary fluid chamber 216 will eventually cause the position of the plurality of balls 250 to be adjacent to the first end 228 of the secondary piston 210 so that the first end 224 of the primary piston 208 will contact the surface 246 of the washer 248, such as that shown in FIG. 3. The increase in apply force transmitted from the input piston 213 to the primary piston 208 will generally be proportional to the difference in the pressures within the primary and secondary fluid chambers 214 and 216. FIG. 4 illustrates the positions of the mechanical force transfer structure 202 in the event of a failure in the primary brake circuit.

Figure 5:
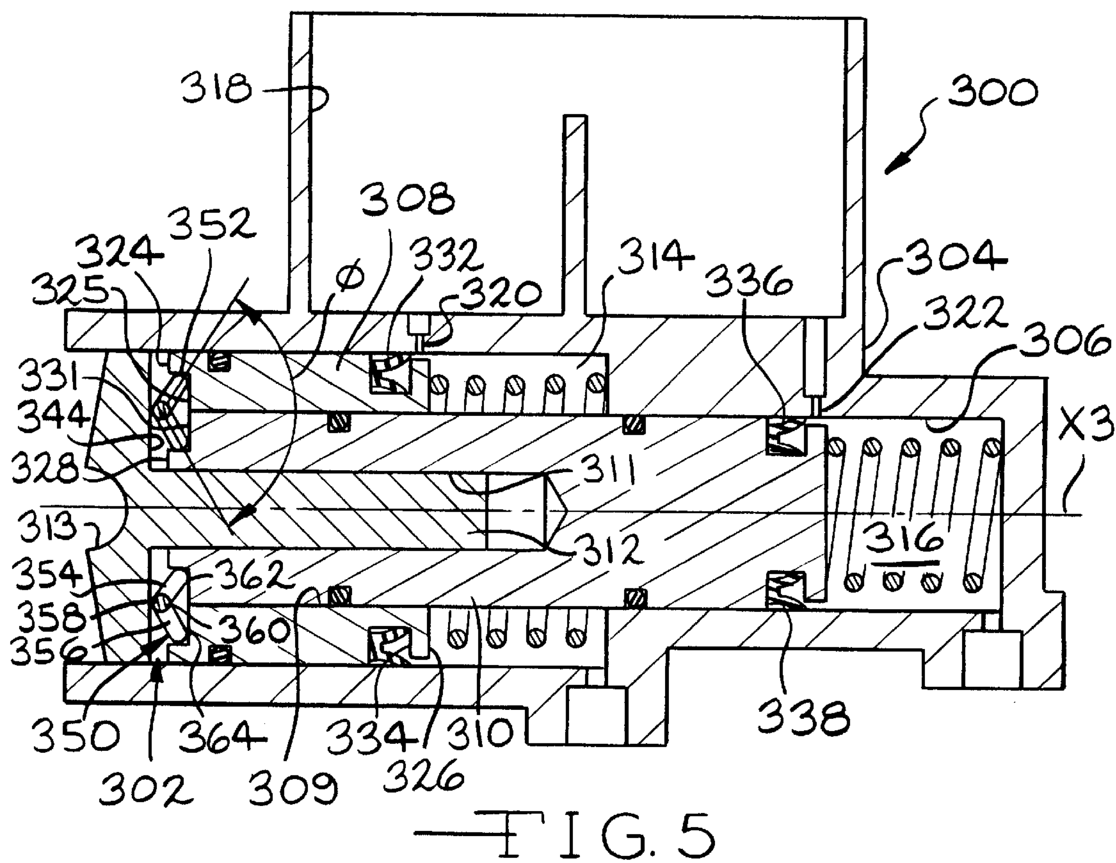
FIG. 5 is a cross-sectional view of a third embodiment of a master cylinder, in accordance with the invention.

FIG. 5 is an illustration of a third embodiment of a master cylinder, indicated at 300, in accordance with the present invention. The master cylinder 300 is generally similar in function and structure to the master cylinder 200 of FIG. 2 but replaces the mechanical force transfer structure 202 with a mechanical force transfer mechanism structure, generally indicated at 302. Features of the master cylinder 300 which are not discussed can be assumed to be similar in function to like features in the master cylinders 10 and 200 of FIGS. 1 and 2, respectively.

The master cylinder 300 includes a housing 304 and a multi-stepped bore 306 formed therein defining an axis "X3". A tubular shaped primary piston 308 having a central bore 309 formed therethrough is slidably disposed within the bore 306. A cylindrically shaped secondary piston 310 is slidably disposed within the central bore 309 of the primary piston 308. The secondary piston 310 has an axial bore 311 in which an axially extending stem 312 of an input piston 313 is slidably disposed. The master cylinder 300 further includes a primary fluid chamber 314 and a secondary fluid chamber 316. A reservoir 318 is in fluid communication with the primary fluid chamber 314 via a primary compensation port 320 formed through the housing 306. The reservoir 318 is also in fluid communication with the secondary fluid chamber 316 via a secondary compensation port 322 formed through the housing 306. The primary piston 306 includes a first end 324 and a second end 326 which defines a movable boundary wall for the primary fluid chamber 314. The first end 324 has an annular recess 325 formed therein. The secondary piston 308 includes a first end 328 and a second end 330 which defines a movable boundary wall for the secondary fluid chamber 316. The first end 328 has an annular recess 331 formed therein. A primary seal 332 is seated within a groove 334 formed in the primary piston 308 and is sealingly engaged with the wall of the bore 306. A secondary seal 336 is seated within a groove 338 formed in the secondary piston 310 and is sealingly engaged with the wall of the bore 306. Preferably, the distance from the primary seal 332 and the primary compensation port 320 is approximately equal to the distance from the secondary seal 336 to the secondary compensation port 322.

Figures 6, 7:
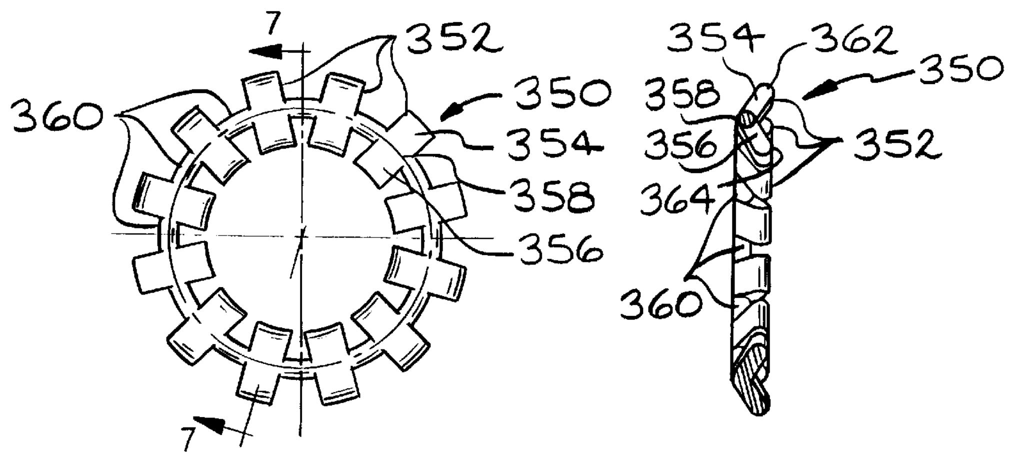
FIG. 6 is a front elevational view of the notched lever ring assembly of FIG. 5.
FIG. 7 is a sectional view of the notched lever ring assembly taken along lines 7—7 of FIG. 6.

The mechanical force transfer structure 302 includes a notched lever ring assembly 350, which is shown in FIGS. 6 and 7. The notched lever ring assembly 350 includes a plurality of V-shaped lever members 352. Each lever member 352 has a first arm 354 and a second arm 356 which extends at an angle ϕ to the first arm 354. The first and second arms 354 and 356 are joined at a vertex portion 358. The plurality of lever members 352 are arranged in a circular arrangement, as best seen in FIGS. 6 and 7. Adjacent ones of the plurality of lever members 352 are joined together by a plurality of cylindrically shaped segment members 360. The lever members 352 are generally independently pivotable about the adjoining area of the segment members 360. Although the lever members 352 and the segment members 360 can be separate structures, preferably, the notched lever ring assembly 350 is made of a single deformable or flexible material, such as spring steel.

The notched lever ring assembly 350 is positioned between an end wall 344 of the input piston 313, and the first and second ends 324 and 328 of the primary and secondary pistons 308 and 310, respectively. The vertex portions 358 of the plurality of lever members 352 are engaged with the end wall 344 of the input piston 313. Each first arm 354 has an end surface 362 which is engaged with the annular recess 325 of the primary piston 308. Each second arm 356 has an end surface 364 which is engaged with the annular recess 331 of the secondary piston 310. The mechanical force transfer structure 302 is generally defined by the notched lever ring assembly 350, the end wall 344 of the input piston 313, and the first ends 324 and 328 of the primary and secondary pistons 308 and 310, respectively.

In operation of the master cylinder 300, the input piston 313 is moved in an apply direction, rightward as viewing FIG. 5, by a pedal input rod (not shown). The end wall 344 of the input piston 313 imparts a force on the vertex portion 358 of the notched lever ring assembly 350. The input force is transmitted through the end surfaces 362 and 364 of the first and second arms 354 and 356, respectively, to the first ends 324 and 328 of the primary and secondary pistons 308 and 310, respectively, thereby causing the primary and secondary pistons 308 and 310 to move in the apply direction. The movement of the primary and secondary pistons 308 and 310 pressurize the primary and secondary fluid chambers 314 and 316, respectively, similar to the master cylinder 20 of FIG. 5.

The mechanical force transfer structure 302 allows the primary piston 308 to move axially with respect to the secondary piston 310, while maintaining generally equal forces acting on the primary and secondary pistons 308 and 310. For example, if the axial travel length of the primary piston 308 was slightly longer than the axial travel length of the secondary piston 310, the V-shaped lever members 352 would pivot about the adjoining area of the segment members 358 to compensate for the different positions of the primary and secondary pistons 308 and 310.

Figures 8, 9:
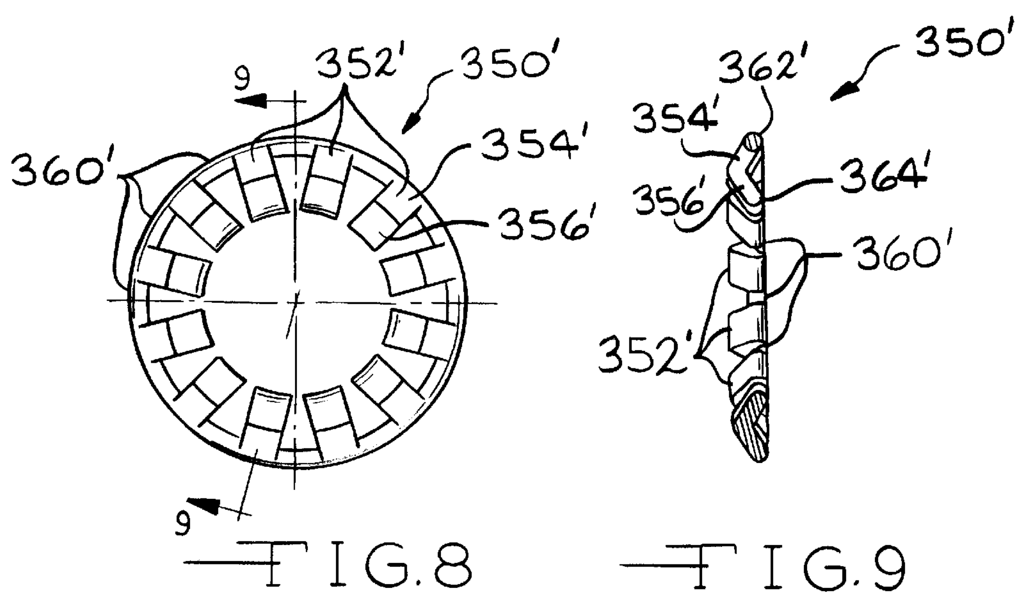
FIG. 8 is a front elevational view of an alternate embodiment of a notched lever ring assembly.
FIG. 9 is a sectional view of the notched lever ring assembly taken along lines 9—9 of FIG. 8.

It should be understood that the plurality of lever members 352 can be joined by the plurality of segment members 360 at any suitable location on the lever members 352. For example, there is illustrated in FIGS. 8 and 9 an alternate embodiment of a notched lever ring assembly 350' having a plurality of lever members 352' joined by a plurality of segment members 360'. The lever members 352' include first and second arms 354' and 356' having end surfaces 362' and 364', respectively. The segment members 360' are fixed to adjacent ones of the plurality of lever members 352' adjacent the end surfaces 362' of the first arms 354'.

Figures 10, 11:
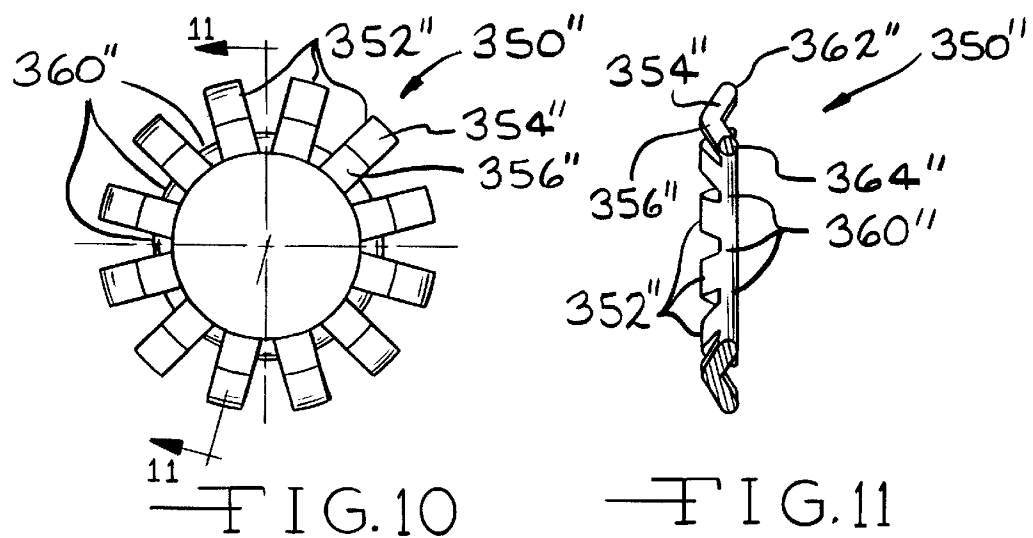
FIG. 10 is a front elevational view of another alternate embodiment of a notched lever ring assembly.
FIG. 11 is a sectional view of the notched lever ring assembly taken along lines 11—11 of FIG. 10.

FIGS. 10 and 11 illustrate another alternate embodiment of a notched lever ring assembly 350" having a plurality of lever members 352" joined by a plurality of segment members 360". The lever members 352" include first and second arms 354" and 356" having end surfaces 362" and 364", respectively. The segment members 360" are fixed to adjacent ones of the plurality of lever members 352" adjacent the end surfaces 364" of the second arms 356".

Referring again to FIG. 5, in the event of a failed primary or secondary brake circuit, the plurality of lever members 352 will be positioned such that the corresponding first or second arm 354 or 356 will be "sandwiched" between the end wall 344 of the input piston 313 and the annular recess 325 or 331 of the primary or secondary piston 308 or 310, respectively, of the non-failed brake circuit. Thus, the apply force of the input piston 313 will automatically be proportionally transmitted to the respective primary piston 308 or the secondary piston 310 of the non-failed brake circuit.

Figure 12:
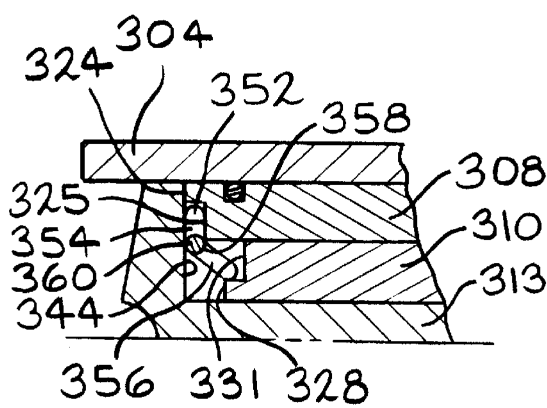
FIG. 12 is a sectional view of a portion of the master cylinder of FIG. 5, illustrating the position of the pistons and the notched lever ring assembly in the event of a secondary brake circuit failure.
Figure 13:
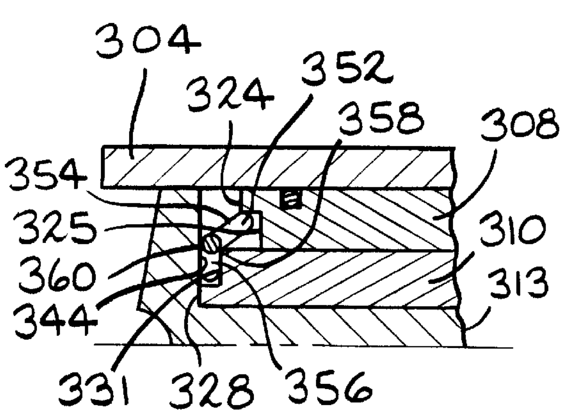
FIG. 13 is a sectional view of a portion of the master cylinder of FIG. 5, illustrating the position of the pistons and the notched lever ring assembly in the event of a primary brake circuit failure.

For example, if the secondary brake circuit failed, such as by a fluid leak, the pressure within the secondary fluid chamber 316 will decrease. The reduction in pressure within the secondary fluid chamber 316 will cause the plurality of lever members 352 to pivot about the adjoining area of the segment members 360, i.e., the vertex portion 358, since the pressure acting on the second end 326 of the primary piston 308 is greater than the pressure acting against the second end 330 of the secondary piston 310. A continuing decrease in the pressure within the secondary fluid chamber 316 will eventually cause the plurality of lever members 352 to pivot until the first arm 354 is sandwiched between the end wall 344 of the input piston and the annular recess 325 of the primary piston 308, such as that shown in FIG. 12. The increase in apply force transmitted from the input piston 313 to the primary piston 308 will generally be proportional to the difference in the pressures within the primary and secondary fluid chambers 314 and 316. FIG. 13 illustrates the positions of the mechanical force transfer structure 302 in the event of a failure in the primary brake circuit.

The principle and mode of operation of this invention have been explained and illustrated in its preferred embodiment. However, it must be understood that this invention may be practiced otherwise than as specifically explained and illustrated without departing from its spirit or scope. For example, while the invention has been described in the embodiments of brake system master cylinders, the principles of operation of this invention may be more broadly applied to hydraulic power cylinders powering multiple hydraulic fluid circuits other than braking circuits.

What is claimed is:

1. A hydraulic power cylinder comprising:

a housing;

a primary piston disposed in said housing and slidable to act upon a primary fluid chamber defined within said housing;

a secondary piston disposed in a nested arrangement with said primary piston and slidably sealing therewith to act upon a secondary fluid chamber defined within said housing;

an input piston slidably disposed within said housing, said input piston being separate from said primary and secondary pistons; and a force transfer means for transferring a force from said input piston to said primary piston and said secondary piston, said force transfer means being unaffixed to said input piston.

2. A hydraulic power cylinder comprising:

a housing having a bore formed therein, said bore defining an axis;

a primary piston slidably disposed within said bore of said housing, said primary piston having an axial bore formed therethrough, said primary piston further having first and second ends, said second end of said primary piston defining a boundary wall of a primary fluid chamber defined within said bore of said housing, said primary fluid chamber being adapted to be connected in fluid communication with a primary hydraulic fluid circuit;

a secondary piston slidably disposed within said axial bore of said primary piston, said secondary piston having first and second ends, said second end of said secondary piston defining a boundary wall of a secondary fluid chamber defined within said bore of said housing, said secondary fluid chamber being adapted to be connected in fluid communication a secondary hydraulic fluid circuit; and an input piston slidably disposed within said bore of said housing, said input piston, said first end of said secondary piston, said first end of said primary piston, and said housing cooperating to define an input fluid chamber, said input fluid chamber containing a fluid for hydraulically coupling said input piston to said first end of said primary piston and said first end of said secondary piston, whereby movement of said input piston in a first direction parallel to said axis urges said primary piston and said secondary piston to move in said first direction.

3. The power cylinder of claim 2, wherein said secondary piston is positioned concentrically with respect to said primary piston within said central bore.

4. The power cylinder of claim 2, wherein said central bore of said primary piston extends through said primary piston, and said secondary piston extends through said central bore.

5. The power cylinder of claim 2, said housing having a primary port and a secondary port formed in said housing and in fluid communication with said bore, said primary piston being movable from a first position to a second position when moving in said first direction, said secondary piston being movable from a first position to a second position when moving in said first direction, said master cylinder further comprising:

a reservoir in fluid communication with said primary fluid chamber via said primary port when said primary piston is in said first position of said primary piston, said reservoir being in fluid communication with said secondary fluid chamber via said secondary port when said secondary piston is in said first position of said secondary piston;

a primary seal mounted on said primary piston and sealingly engaged with a first inner wall of said bore of said housing, said primary seal positioned adjacent said primary port so that movement of said primary piston in said first direction from said first position of said primary piston to said second position of said primary piston causes said primary seal to move past said primary port, thereby restricting the flow of fluid from said primary fluid chamber to said reservoir; and a secondary seal mounted on said secondary piston and sealingly engaged with a second inner wall of said bore of said housing, said secondary seal positioned adjacent said secondary port so that movement of said secondary piston in said first direction from said first position of said secondary piston to said second position of said secondary piston causes said secondary seal to move past said secondary port, thereby restricting the flow of fluid from said secondary fluid chamber to said reservoir.

6. The power cylinder of claim 5, wherein said primary seal is axially positioned a first distance from said primary port when said primary piston is in said first position of said primary piston, said secondary seal being axially positioned a second distance from said secondary port when said secondary piston is in said second position of said secondary piston, said second distance being greater than said first distance, said first end of said primary piston being spaced from said input piston when said primary piston is in said first position of said primary piston, and said first end of said secondary piston being in contact with said input piston when said secondary piston is in said first position of said secondary piston.

7. The power cylinder of claim 5, wherein said housing has a passageway formed therein, said passageway being in fluid communication with said reservoir and said input fluid chamber, said master cylinder further including a valve for selectively preventing fluid communication between said reservoir and said input fluid chamber through said passageway.

8. The power cylinder of claim 2, wherein said input fluid chamber is in fluid communication with a source of pressurized fluid including a second valve for selectively controlling the flow of fluid from said source to said input fluid chamber.

9. The power cylinder of claim 2, wherein said power cylinder is a master cylinder adapted to be used with a hydraulic brake system in a motor vehicle.

10. A power cylinder comprising:

a housing having a bore formed therein, said bore defining an axis;

a primary piston slidably disposed within said bore of said housing, said primary piston having a central bore formed therethrough, said primary piston further having first and second ends, said first end of said primary piston having a sloped surface at an angle to said axis, said second end of said primary piston defining a boundary wall of a primary fluid chamber defined within said bore of said housing, said primary fluid chamber being adapted to be connected in fluid communication with a primary hydraulic fluid circuit;

a secondary piston slidably disposed within said central bore of said primary piston, said secondary piston having first and second ends, said first end of said secondary piston having a sloped surface at an angle to said axis, said second end of said secondary piston defining a boundary wall of a secondary fluid chamber defined within said bore of said housing, said secondary fluid chamber being adapted to be connected in fluid communication with a secondary hydraulic fluid circuit;

an input piston slidably disposed within said bore of said housing and;

a ball engaging said input piston, said sloped surface of said primary piston, and said sloped surface of said secondary piston, wherein an input force acting on said input piston urges said ball against said sloped surfaces of said primary and secondary pistons causing said primary piston and said secondary piston to move in said first direction such that said primary piston is axially movable relative to said secondary piston by a rolling movement of said ball against said sloped surfaces of said primary and secondary pistons, thereby pressurizing the fluid within said first and second chambers so that the fluid pressure within said primary and secondary fluid chamber is approximately equal.

11. The power cylinder of claim 10, wherein said sloped surfaces of said primary and secondary pistons are mutually inclined at an angle within the range of from about 40 degrees to about 50 degrees with respect to the axis.

12. The power cylinder of claim 10, wherein said sloped surfaces of said primary and secondary pistons are mutually inclined at an angle of about 45 degrees with respect to the axis, such that said sloped surface of said primary piston is at an angle of about 90 degrees to said sloped surface of said secondary piston.

13. The power cylinder of claim 10, wherein said sloped surfaces of said primary and secondary pistons are annular sloped surfaces.

14. The power cylinder of claim 10, further including a plurality of balls engaging said input piston, said sloped surface of said primary piston, and said sloped surface of said secondary piston.

15. The power cylinder of claim 14, wherein said sloped surfaces of said primary and secondary pistons are annular sloped surfaces.

16. The power cylinder of claim 10, wherein said input piston has an end wall perpendicular to said axis of said bore of said housing, said end wall being adapted to engage said ball.

17. The power cylinder of claim 16, wherein said end wall is made of a material having a coefficient of friction within the range of from about 0.04 to about 0.35.

18. The power cylinder of claim 10, wherein said first end of said primary piston is tubular, and has a radially extending end wall having a thickness which is greater than said diameter of said ball.

19. The power cylinder of claim 10, wherein said first end of said secondary piston is tubular shaped having a radially extending wall having a thickness which is greater than said diameter of said ball.

20. The power cylinder of claim 19, wherein said secondary piston has an axial bore formed in said first end of said secondary piston, said input piston having an axially extending stem portion disposed within said axial bore of said secondary piston.

21. The power cylinder of claim 10, wherein said power cylinder is a master cylinder adapted to be used with a hydraulic brake system in a motor vehicle.

22. A hydraulic power cylinder comprising:

a housing having a bore formed therein, said bore defining an axis;

a primary piston slidably disposed within said bore of said housing, said primary piston having an axial bore formed therethrough, said primary piston further having first and second ends, said second end of said primary piston defining a boundary wall of a primary fluid chamber defined within said bore of said housing, said primary fluid chamber adapted to be connected in fluid communication with a primary fluid circuit;

a secondary piston slidably disposed within said central bore of said primary piston, said secondary piston having first and second ends, said second end of said secondary piston defining a boundary wall of a secondary fluid chamber defined within said bore of said housing, said secondary fluid chamber adapted to be in fluid communication with a secondary fluid circuit;

an input piston slidably disposed within said bore of said housing; and a notched lever ring assembly comprising:

a plurality of V-shaped lever members, each lever member comprising a first arm and a second arm extending at an angle to said first arm and joined to said first arm at a vertex portion, said first and second arms having end surfaces; and a plurality of segment members, each of said segment members being fixed to adjacent ones of said plurality of lever members such that said lever members are positioned in a circular arrangement, wherein said vertex portions of said plurality of said lever members being engaged with said input piston, said end surfaces of said first arms being engaged with said first end of said primary piston, said end surfaces of said second arms being engaged with said first end of said secondary piston.

23. The power cylinder of claim 21, wherein said notched lever ring assembly is made of a single flexible material.

24. The power cylinder of claim 22, wherein said segment members are fixed to adjacent ones of said plurality of lever members at said vertex portions of said plurality of lever members.

25. The power cylinder of claim 22, wherein said segment members are fixed to adjacent ones of said plurality of lever members adjacent said end surfaces of said first arms of said plurality of lever members.

26. The power cylinder of claim 22, wherein said segment members are fixed to adjacent ones of said plurality of lever members adjacent said end surfaces of said second arms of said plurality of lever members.

27. The power cylinder of claim 22, wherein said power cylinder is a master cylinder adapted to be used with a hydraulic brake system in a motor vehicle.

28. A notched lever ring assembly comprising:

a plurality of V-shaped lever members, each lever member comprising a first arm and a second arm extending at an angle to said first arm and joined to said first arm at a vertex portion; and a plurality of segment members, each of said segment members being fixed to adjacent ones of said plurality of lever members such that said lever members are positioned in a circular arrangement with said first arms being generally inwardly extending with respect to said circular arrangement and said second arms being generally outwardly extending with respect to said circular arrangement.

29. The ring assembly of claim 28, wherein said lever members and said segment members are made of a single flexible material.

30. The ring assembly of claim 28, wherein said segment members are fixed to adjacent ones of said plurality of lever members at said vertex portions of said plurality of lever members.

31. The ring assembly of claim 28, wherein each said segment member is fixed to an adjacent pair of said plurality of lever members adjacent said end surfaces of said first arms of said pair of lever members.

32. The ring assembly of claim 28, wherein each said segment member is fixed to an adjacent pair of said plurality of lever members adjacent said end surfaces of said second arms of said pair of lever members.

* * * * *